US010755399B2

(12) United States Patent
Horiuchi et al.

(10) Patent No.: US 10,755,399 B2
(45) Date of Patent: Aug. 25, 2020

(54) IMAGE PROCESSING DEVICE, IMAGE PROCESSING METHOD, AND IMAGE PROCESSING PROGRAM

(71) Applicant: OLYMPUS CORPORATION, Hachioji-shi, Tokyo (JP)

(72) Inventors: Kazuhito Horiuchi, Tokyo (JP); Osamu Koshiba, Chiba (JP)

(73) Assignee: OLYMPUS CORPORATION, Tokyo (JP)

( * ) Notice: Subject to any disclaimer, the term of this patent is extended or adjusted under 35 U.S.C. 154(b) by 89 days.

(21) Appl. No.: 16/213,146

(22) Filed: Dec. 7, 2018

(65) Prior Publication Data

US 2019/0108629 A1 Apr. 11, 2019

Related U.S. Application Data

(63) Continuation of application No. PCT/JP2016/067781, filed on Jun. 15, 2016.

(51) Int. Cl.
*G06T 5/50* (2006.01)
*G06T 7/13* (2017.01)
(Continued)

(52) U.S. Cl.
CPC ............... *G06T 5/50* (2013.01); *G06T 5/00* (2013.01); *G06T 5/002* (2013.01); *G06T 5/10* (2013.01);
(Continued)

(58) Field of Classification Search
CPC .. G06T 5/002; G06T 5/10; G06T 5/20; G06T 5/50; G06T 7/13; G06T 2207/20182; G06T 2207/20192; G06T 2207/20221
See application file for complete search history.

(56) References Cited

U.S. PATENT DOCUMENTS 8,659,683 B1 2/2014 Linzer ..................... 348/241
9,137,464 B2 9/2015 Hirai ................ H04N 5/357
(Continued)

FOREIGN PATENT DOCUMENTS

EP 2950267 A1 12/2015
JP 2008113337 A 5/2008
(Continued)

OTHER PUBLICATIONS

International Search Report (ISR) dated Jul. 19, 2016 issued in International Application No. PCT/JP2016/067781.
(Continued)

*Primary Examiner* — Andrew W Johns
(74) *Attorney, Agent, or Firm* — Holtz, Holtz & Volek PC

(57) ABSTRACT

An image processing device includes a computer that is configured to: detect edge-strength information expressing an edge strength in an acquired image; apply noise-reduction processing using spatial information to the image; apply noise-reduction processing using frequency information to the image; and composite a first processed image subjected to the noise-reduction processing using spatial information and a second processed image subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

12 Claims, 11 Drawing Sheets

(51) Int. Cl.
*H04N 1/409* (2006.01)
*G06T 5/00* (2006.01)
*G06T 5/10* (2006.01)
*G06T 5/20* (2006.01)

(52) U.S. Cl.
CPC ............... *G06T 5/20* (2013.01); *G06T 7/13* (2017.01); *H04N 1/409* (2013.01); *G06T 2207/20182* (2013.01); *G06T 2207/20192* (2013.01); *G06T 2207/20221* (2013.01)

(56) References Cited

U.S. PATENT DOCUMENTS

| | | | | |
|---|---|---|---|---|
| 2008/0123984 | A1* | 5/2008 | Xie | G06T 5/20 382/254 |
| 2008/0304731 | A1* | 12/2008 | Kimura | G06T 5/002 382/131 |
| 2013/0165788 | A1 | 6/2013 | Osumi et al. | A61B 8/5207 |
| 2014/0118578 | A1 | 5/2014 | Sasaki et al. | H04N 5/357 |
| 2015/0339806 | A1 | 11/2015 | Wu et al. | G06T 5/002 |

FOREIGN PATENT DOCUMENTS

| | | |
|---|---|---|
| JP | 2012104968 A | 5/2012 |
| JP | 2013150778 A | 8/2013 |
| JP | 2014081764 A | 5/2014 |
| JP | 2015035198 A | 2/2015 |
| JP | 2015225665 A | 12/2015 |
| WO | 2012063885 A1 | 5/2012 |

OTHER PUBLICATIONS

Written Opinion dated Jul. 19, 2016 issued in International Application No. PCT/JP2016/067781.

* cited by examiner

IMAGE PROCESSING DEVICE, IMAGE PROCESSING METHOD, AND IMAGE PROCESSING PROGRAM

CROSS-REFERENCE TO RELATED APPLICATIONS

This is a continuation of International Application PCT/JP2016/067781 which is hereby incorporated by reference herein in its entirety.

TECHNICAL FIELD

The present invention relates to an image processing device, an image processing method, and an image processing program.

BACKGROUND ART

There is a known image processing method in which noise reduction is performed on the basis of the strength of edges in an acquired image (for example, see PTL 1 and PTL 2). This method uses Non Local Means (NLM) processing using, as spatial information, weights based on the similarities between a pixel-of-interest region and regions of adjacent pixels. Furthermore, there is a known technique for performing noise reduction using, as frequency information, frequency components based on edge strengths (for example, see PTL 3).

CITATION LIST

Patent Literature

{PTL 1} Japanese Unexamined Patent Application, Publication No. 2013-150778
{PTL 2} Japanese Unexamined Patent Application, Publication No. 2015-225665
{PTL 3} Japanese Unexamined Patent Application, Publication No. 2014-81764

SUMMARY OF INVENTION

According to one aspect, the present invention provides an image processing device including: a computer that is configured to: detect edge-strength information expressing an edge strength in an acquired image; apply noise-reduction processing using spatial information to the image; apply noise-reduction processing using frequency information to the image; and composite a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

Furthermore, according to another aspect, the present invention provides an image processing method including: detecting edge-strength information expressing an edge strength in an acquired image; applying noise-reduction processing using spatial information to the image; applying noise-reduction processing using frequency information to the image; and compositing a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

Furthermore, according to still another aspect, the present invention provides a non-transitory computer-readable medium having an image processing program stored thereon, the image processing program causing a computer to execute functions of: detecting edge-strength information expressing an edge strength in an acquired image; applying noise-reduction processing using spatial information to the image; applying noise-reduction processing using frequency information to the image; and compositing a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

DESCRIPTION OF EMBODIMENTS

An image processing device 1, an image processing method, and an image processing program according to one embodiment of the present invention will be described below with reference to the drawings.

Figure 1:
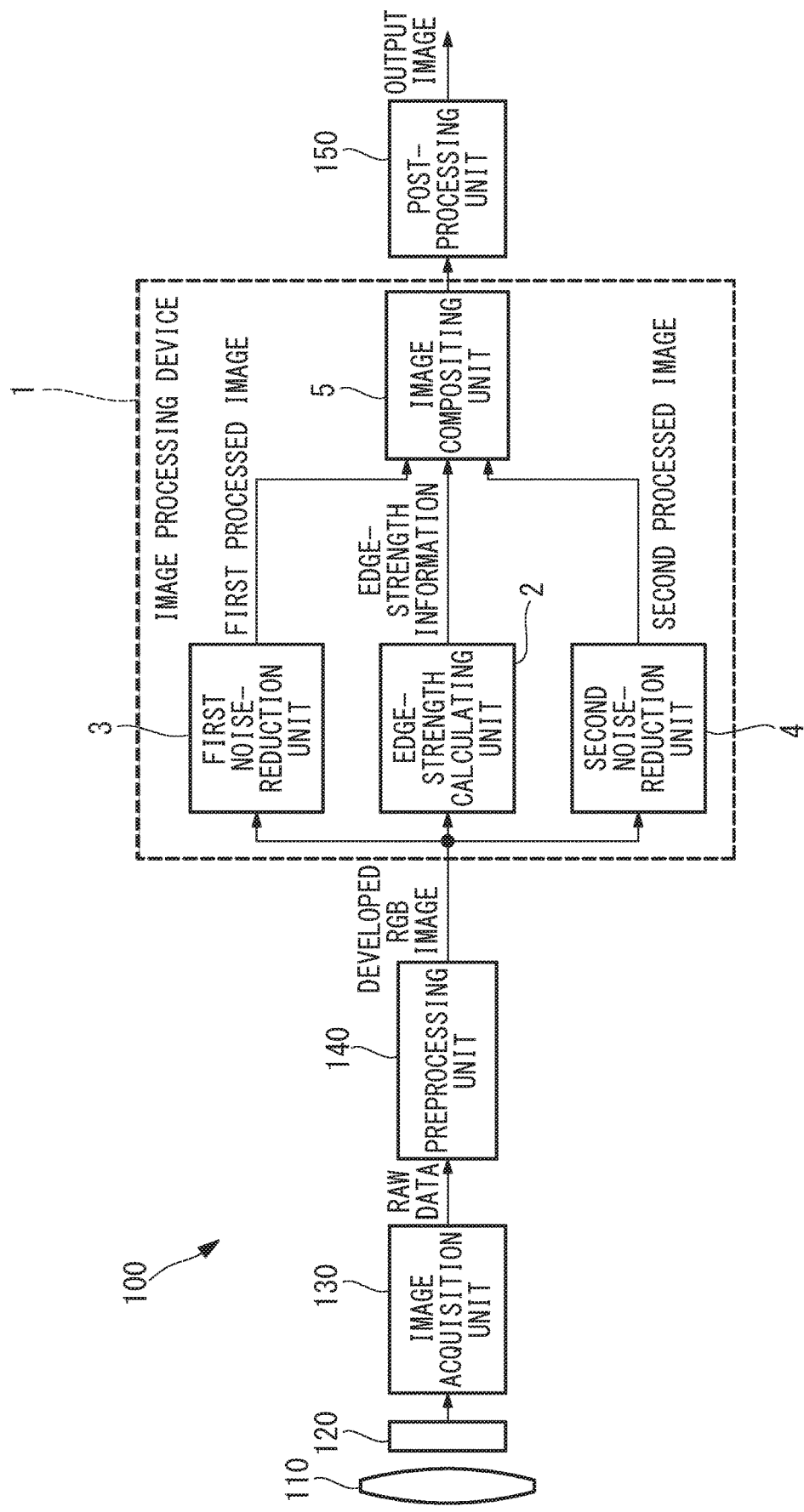
FIG. 1 is a block diagram showing a camera that is provided with an image processing device according to one embodiment of the present invention.

As shown in FIG. 1, the image processing device 1 of this embodiment is provided in a camera 100, for example.

The camera 100 is provided with an image capturing lens 110, an image acquisition element 120, an image acquisition unit 130, a preprocessing unit 140, the image processing device 1 of this embodiment, and a post-processing unit 150. The image capturing lens 110 focuses light from a subject. The image acquisition element 120 captures the light focused by the image capturing lens 110. The image acquisition unit 130 outputs an image signal acquired by the image acquisition element 120 in the form of RAW data. The preprocessing unit 140 applies preprocessing to the RAW data output from the image acquisition unit 130.

The preprocessing unit 140 uses conditions used at the time of image capturing, e.g., the f-number, the focal length, the ISO sensitivity, and the shutter speed, to perform OB (Optical Black) correction processing, WB (White Balance) correction processing, color-information interpolation (demosaicing) processing, etc., and outputs a developed RGB image.

The post-processing unit 150 applies distortion correction, data compression processing, etc., to an image output from the image processing device 1, to generate a final output image.

The image processing device 1 of this embodiment is provided with: an edge-strength calculating unit (edge-strength detecting unit) 2, a first noise-reduction unit 3, and a second noise-reduction unit 4 to each of which the developed RGB image output from the preprocessing unit 140 is input; and an image compositing unit 5 that composites a first processed image output from the first noise-reduction unit 3 and a second processed image output from the second noise-reduction unit 4.

Figure 2:
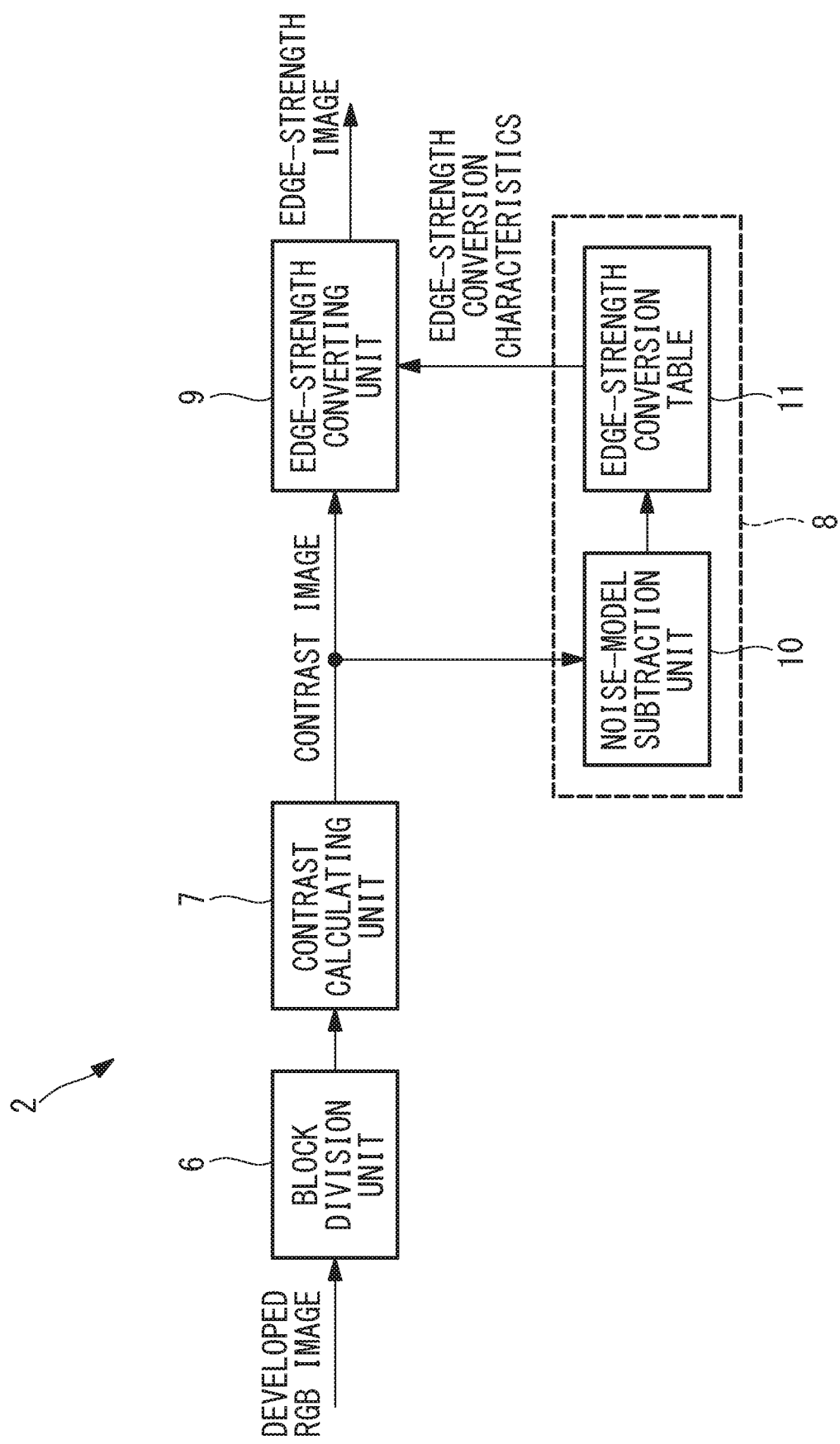
FIG. 2 is a block diagram showing an edge-strength calculating unit of the image processing device shown in FIG. 1.

As shown in FIG. 2, the edge-strength calculating unit 2 is provided with: a block division unit 6 that converts the input developed RGB image into a plurality of blocks formed of a plurality of pixels; a contrast calculating unit 7 that calculates information about contrast, for each of the blocks, to generate a contrast image; a conversion-characteristics extracting unit 8 that reads edge-strength conversion characteristics on the basis of the contrast image generated by the contrast calculating unit 7; an edge-strength converting unit 9 that generates an edge-strength image from the contrast image on the basis of the edge-strength conversion characteristics read by the conversion-characteristics extracting unit 8.

The information about contrast calculated in the contrast calculating unit 7 includes, for example, a calculation result of a filter related to edge detection (edge detection filter). Specifically, a known filter, such as a Laplacian filter, a Prewitt filter, a Sobel filter, or a Canny filter, may be used. Such filters detect edges, i.e., a change in luminance, and use the edge strength as the amount of change in luminance. In this case, as the amount of change in luminance becomes larger, the edge strength becomes larger.

Furthermore, another type of information about contrast includes information for estimating contrast without depending on edges. Specifically, luminance dispersion in a block, the degree of texture of a pattern in a block, the distribution of frequency components in a block, the contrast value and the blur amount of a subject in a block, etc., can be included. These types of information are mostly based on a variation in luminance in a block, and, for example, it is conceivable that, as the luminance dispersion becomes larger, the variation in luminance becomes larger, and the edge strength becomes larger. Similarly, it is conceivable that, as the degree of texture, the frequency distribution, and the contrast value become larger, the edge strength becomes larger, and, as the blur amount becomes smaller, the edge strength becomes larger.

Still another type of information about contrast can include information expressing pattern flatness, as the evaluation value indicating the absence of edges. When the flatness in a block is large, this indicates that a pattern in which the luminance varies does not exist in the block, and thus, it is conceivable that the edge strength is small.

The contrast calculating unit 7 uses at least one of the above-described types of information about contrast to generate a contrast image in which each pixel includes the information about contrast.

The conversion-characteristics extracting unit 8 is provided with: a noise-model subtraction unit 10 and an edge-strength conversion table 11.

The noise-model subtraction unit 10 subtracts noise corresponding to a noise model that is obtained in advance by measuring the amount of noise with respect to the luminance of the image, from the contrast image calculated in the contrast calculating unit 7.

Figure 3:
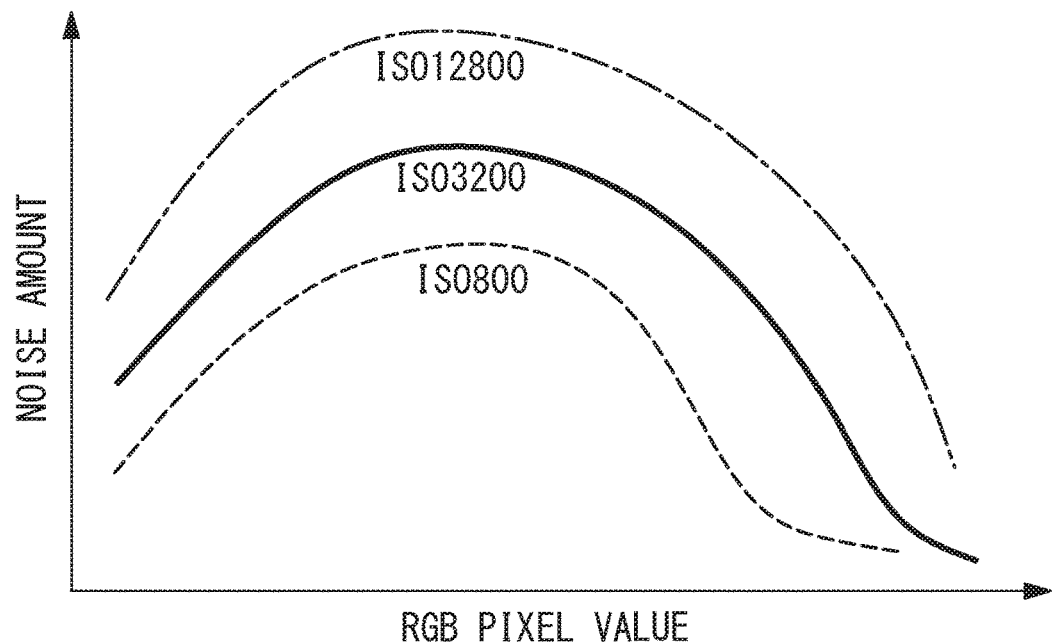
FIG. 3 is a view showing example noise models to be subtracted in a noise-model subtraction unit provided in the edge-strength calculating unit shown in FIG. 2.

FIG. 3 shows example noise models. In those noise models, there is more noise as the ISO sensitivity becomes larger. Furthermore, there is a case in which, in a noise model obtained after the RGB image is generated, the luminance is converted from the RAW data due to tone characteristics (γ characteristics); thus, the amount of noise is not always large if RGB pixel values are large, and, in the example shown in FIG. 3, the amount of noise is the maximum at intermediate tone or slightly darker luminance.

Figure 4:
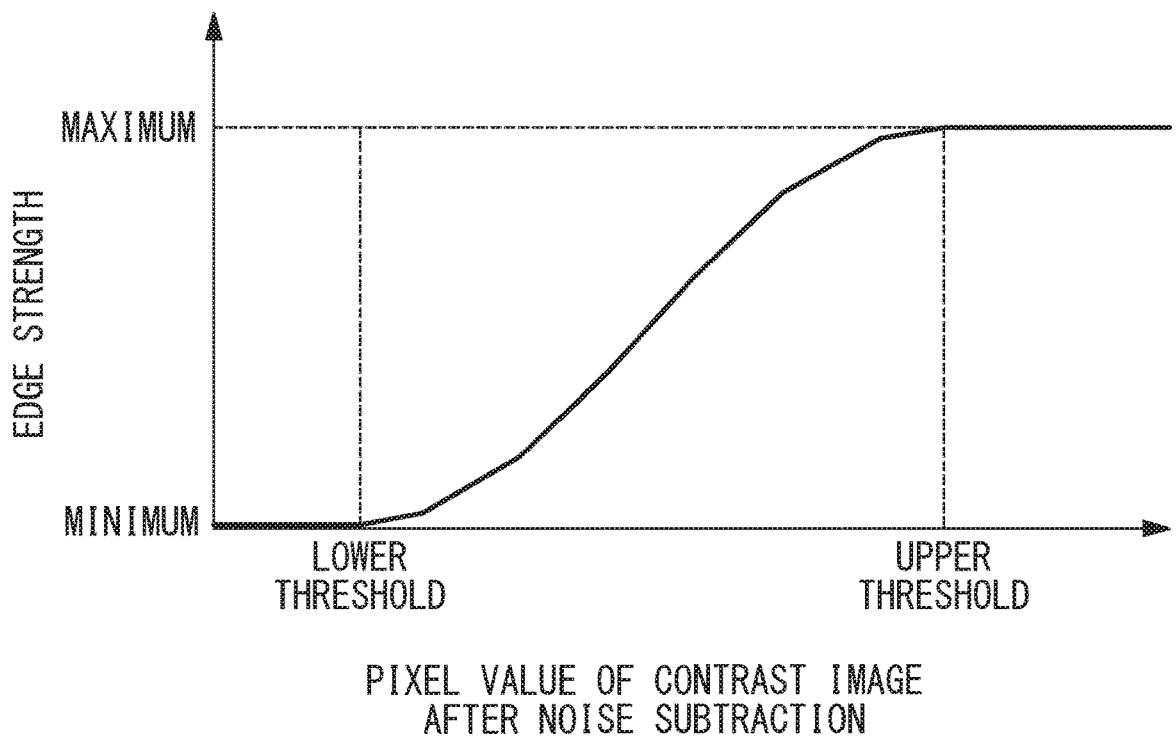
FIG. 4 is a view showing example edge-strength conversion characteristics stored in an edge-strength conversion table provided in the edge-strength calculating unit shown in FIG. 2.

Then, characteristics for converting, into edge-strength information, from contrast-image information that is obtained after noise components are subtracted in the noise-model subtraction unit 10 are referred to in the edge-strength conversion table 11. FIG. 4 shows example conversion characteristics stored in the table.

The conversion characteristics shown in FIG. 4 express the edge strength with respect to the contrast-image information (pixel values). Zero is the minimum for the edge strength. When the contrast-image information is less than a lower threshold, it is considered that there is no edge, and the edge strength is set to zero (the minimum). Furthermore, when the contrast-image information is greater than an upper threshold, it is considered that there is a sufficient edge strength, and the edge strength is set to the maximum.

The characteristics shown in FIG. 4 are based on the assumption that the luminance distribution used as the contrast-image information. Instead of this, it is also possible to hold, in the edge-strength conversion table 11, a plurality of types of characteristics corresponding to the features defined as the contrast-image information and to select and refer to the characteristics according to the type or structure of the contrast-image information.

The edge-strength converting unit 9 converts the contrast image generated in the contrast calculating unit 7 into the edge strength by using the edge-strength conversion characteristics output from the edge-strength conversion table 11. In this embodiment, due to the edge-strength conversion characteristics shown in FIG. 4, as the contrast-image information becomes larger, the edge strength becomes larger.

Figure 5:
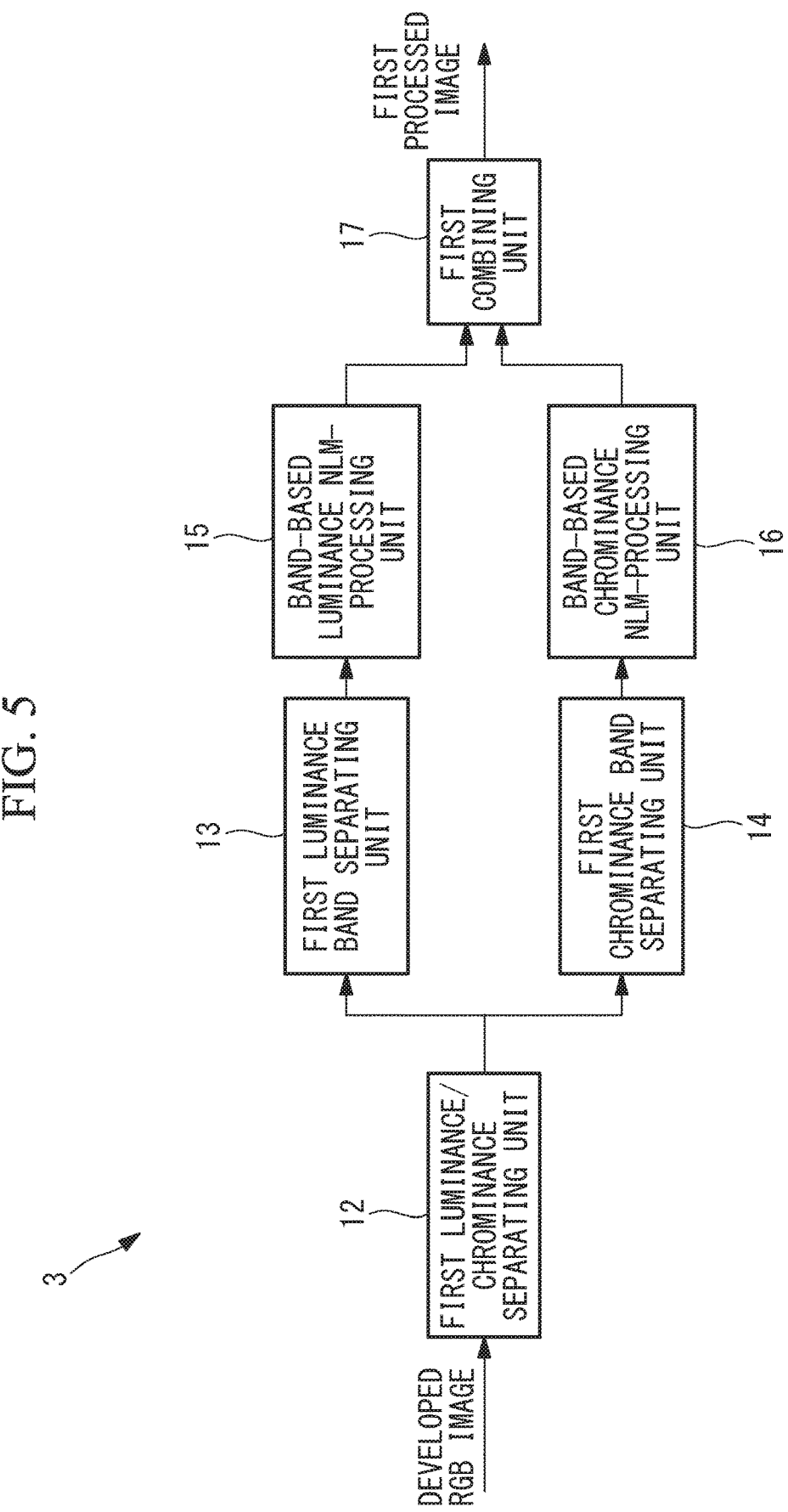
FIG. 5 is a block diagram showing a first noise-reduction unit of the image processing device shown in FIG. 1.

As shown in FIG. 5, the first noise-reduction unit 3 is provided with a first luminance/chrominance separating unit 12, a first luminance band separating unit 13, a first chrominance band separating unit 14, a band-based luminance NLM-processing unit 15, a band-based chrominance NLM-processing unit 16, and a first combining unit 17. The first luminance/chrominance separating unit 12 separates the developed RGB image into luminance information and chrominance information. The first luminance band separating unit 13 separates, into bands, the luminance information separated in the first luminance/chrominance separating unit 12. The first chrominance band separating unit 14 separates, into bands, the chrominance information separated in the first luminance/chrominance separating unit 12. The band-based luminance NLM-processing unit 15 performs NLM processing that is noise-reduction processing, for the respective bands separated by the first luminance band separating unit 13. The band-based chrominance NLM-processing unit 16 performs the NLM processing for the respective bands separated by the first chrominance band separating unit 14. The first combining unit 17 combines the luminance information in the bands and the chrominance information in the bands, which have been subjected to the NLM processing, to generate a first processed image that has been subjected to the noise-reduction processing.

Separating an image into bands means image down sampling and, for example, corresponds to providing a plurality of band images, i.e., providing an image that has the same size as the RGB image, in a first band, an image that is reduced by ½ the width and the height of the RGB image, in a second band, and an image that is reduced by ¼ the width and the height of the RGB image, in a third band.

NLM processing is processing in which the similarities of surrounding regions with respect to a region that includes a pixel of interest are evaluated, thereby performing noise reduction, and has excellent noise-reduction performance particularly on a section having large contrast, such as an edge.

The first combining unit 17 does not convert the luminance information and the chrominance information into an RGB image, but converts the luminance information and the chrominance information into information following formats to be referred to in the subsequent compositing processing (formats in a predetermined order, e.g., a luminance NLM-processing image in the first band, a chrominance NLM-processing image in the first band, a luminance NLM-processing image in the second band, etc.). The thus-combined information is referred to as a first processed image.

Figure 6:
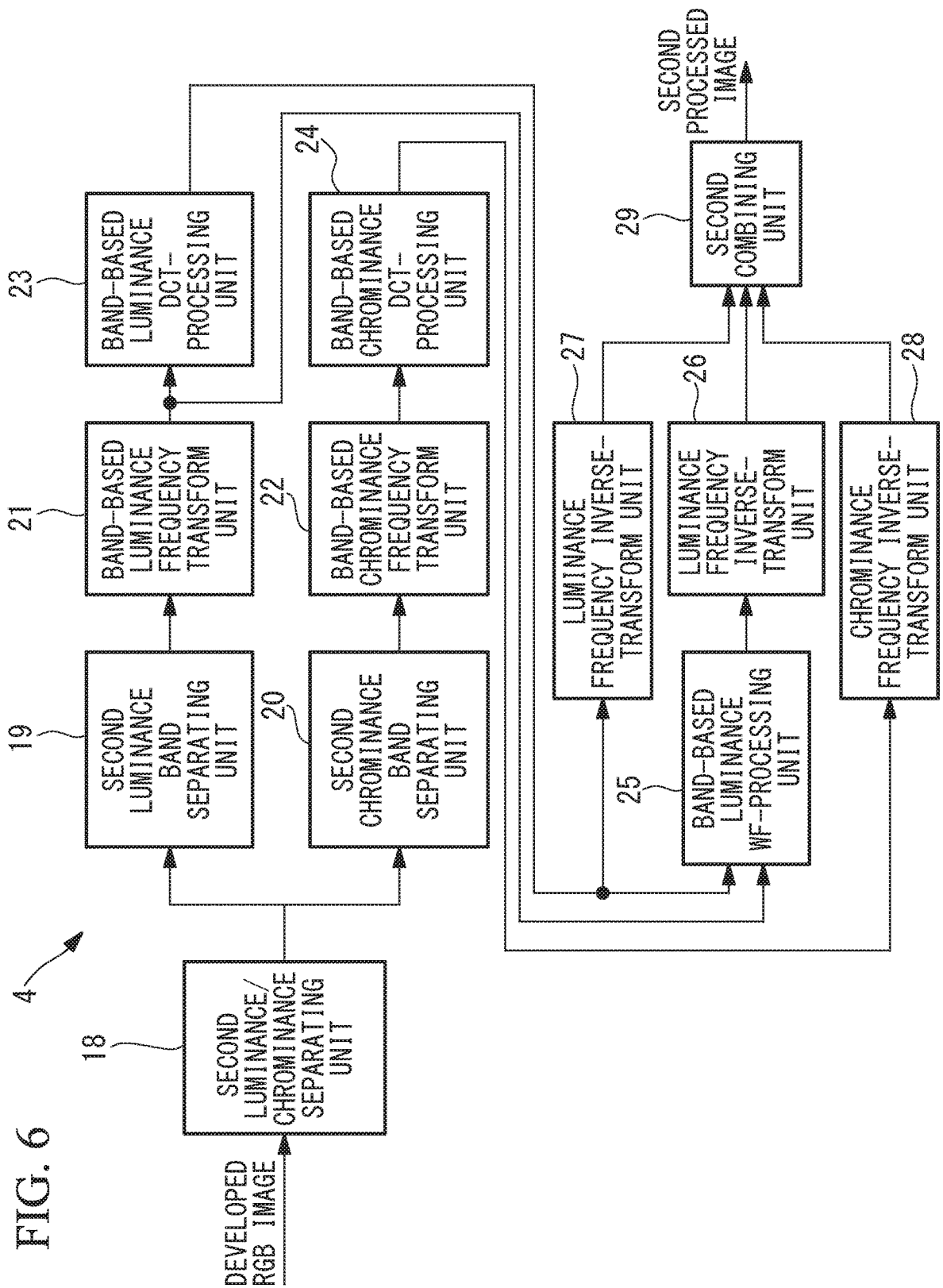
FIG. 6 is a block diagram showing a second noise-reduction unit of the image processing device shown in FIG. 1.

As shown in FIG. 6, the second noise-reduction unit 4 is provided with: a second luminance/chrominance separating unit 18 that separates the developed RGB image into luminance information and chrominance information; and a second luminance band separating unit 19 that separates, into bands, the luminance information separated in the second luminance/chrominance separating unit 18 and a second chrominance band separating unit 20 that separates, into bands, the chrominance information separated therein. Furthermore, the second noise-reduction unit 4 is provided with: a band-based luminance frequency transform unit 21 that applies a discrete cosine transform (DCT) to the luminance information separated into bands, for the respective bands, thus obtaining the luminance information in the form of frequency components; and a band-based chrominance frequency transform unit 22 that applies a discrete cosine transform to the chrominance information separated into bands, for the respective bands, thus obtaining the chrominance information in the form of frequency components.

Furthermore, the second noise-reduction unit 4 is provided with: a band-based luminance DCT-processing unit 23 that applies DCT-coring processing that is noise-reduction processing to the luminance information in the form of the frequency components transformed by the band-based luminance frequency transform unit 21; a band-based chrominance DCT-processing unit 24 that applies the DCT-coring processing to the chrominance information in the form of the frequency components transformed by the band-based chrominance frequency transform unit 22; and a band-based luminance WF-processing unit 25 applies, by using the luminance information that has been subjected to the DCT-coring processing, Wiener filtering processing to the luminance information in the form of the frequency components transformed by the band-based luminance frequency transform unit 21.

Furthermore, the second noise-reduction unit 4 is provided with: luminance frequency inverse-transform units 26 and 27 and a chrominance frequency inverse-transform unit 28 that respectively apply frequency inverse transforms to the band-based luminance information that has been subjected to the DCT-coring processing, the chrominance information that has been subjected to the DCT-coring processing, and the band-based luminance information that has been subjected to the Wiener filtering processing; and a second combining unit 29 that combines images output from these inverse-transform units, to generate a second processed image that has been subjected to the noise-reduction processing.

Figure 7A:
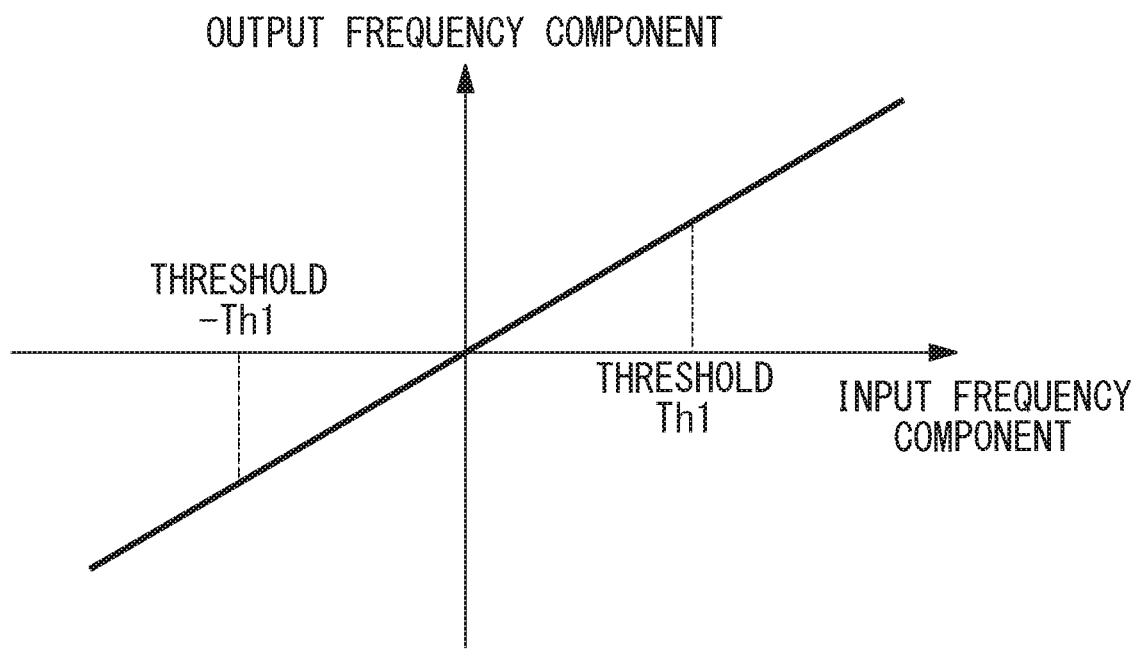
FIG. 7A is a view showing an example relationship between an input frequency component that has not been processed and an output frequency component, for explaining coring processing performed in the second noise-reduction unit shown in FIG. 6.
Figure 7B:
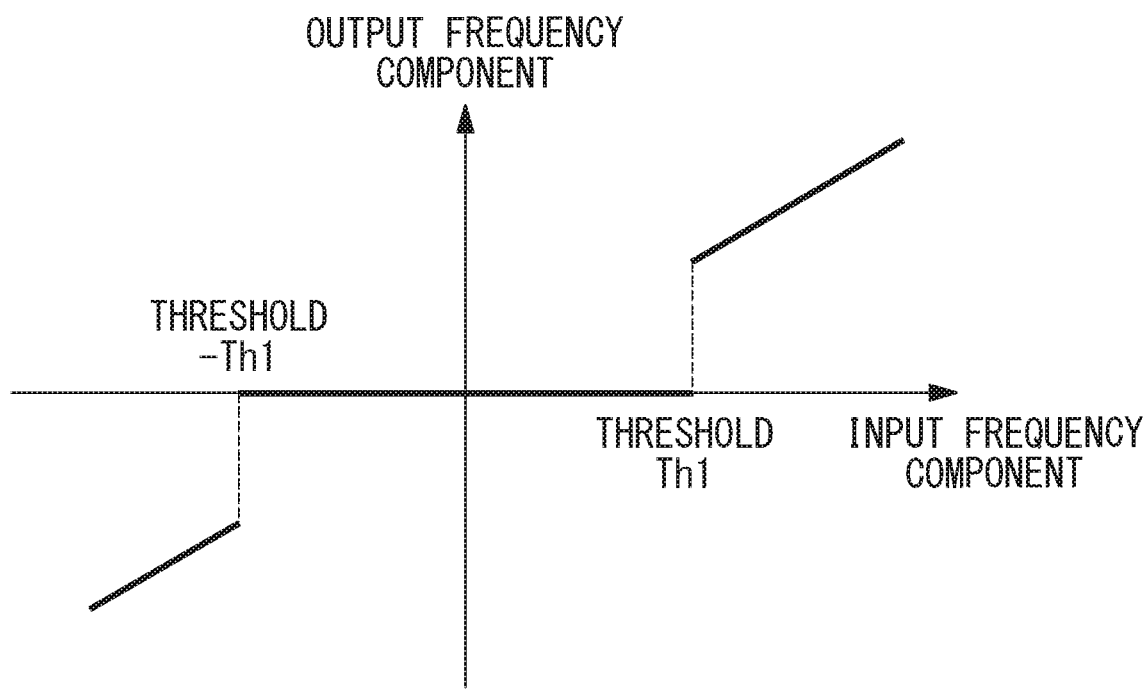
FIG. 7B is a view showing an example relationship between an input frequency component that has been processed and an output frequency component, for explaining the coring processing performed in the second noise-reduction unit shown in FIG. 6.

The DCT-coring processing performed in the band-based luminance DCT-processing unit 23 and the band-based chrominance DCT-processing unit 24 is processing for reducing frequency components in a predetermined range shown in FIG. 7A, as shown in FIG. 7B, and is processing for performing coring processing such that an output frequency component within the range of thresholds from −Th1 to Th1 becomes zero, for example. However, the output frequency component does not necessarily become zero, and it is also possible to have characteristics in which the absolute value of an output frequency component within the range of thresholds from −Th1 to Th1, for example, is reduced and slowly changes according to an input frequency component.

In this embodiment, the fact that noise components are composed of relatively high frequency components is focused on, and thus, coring processing is applied to high-frequency components to remove noise.

The band-based luminance WF-processing unit 25 applies Wiener filtering processing to the luminance information in the form of frequency components transformed by the band-based luminance frequency transform unit 21, with respect to a particular band, by using, as a guide, the luminance information that has been subjected to the DCT-coring processing. Here, the particular band is a band that has relatively high frequency components. Here, with the aim of removing only noise components while maintaining the true pattern of the image, a Wiener filter based on the idea of minimum square error is applied.

The luminance frequency inverse-transform units 26 and 27 and the chrominance frequency inverse-transform unit 28 apply frequency inverse transforms to luminance frequency information in the band that has been subjected to the DCT-coring processing and the wiener filtering processing and luminance and chrominance frequency information in the band that has been subjected only to the DCT-coring processing, thus turning them back to real-spatial information. Because the DCT processing is applied as frequency transform processing in the band-based luminance frequency transform unit 21 and the band-based chrominance frequency transform unit 22, inverse DCT processing is applied in the luminance frequency inverse-transform units 26 and 27 and the chrominance frequency inverse-transform unit 28.

The second combining unit 29 combines, according to the same formats as those in the first combining unit 17, band-based luminance frequency noise-reduction images output from the luminance frequency inverse-transform units 26 and 27 and a band-based chrominance frequency noise-reduction image output from the chrominance frequency inverse-transform unit 28, into a single piece of information, and outputs it as a second processed image.

Figure 8:
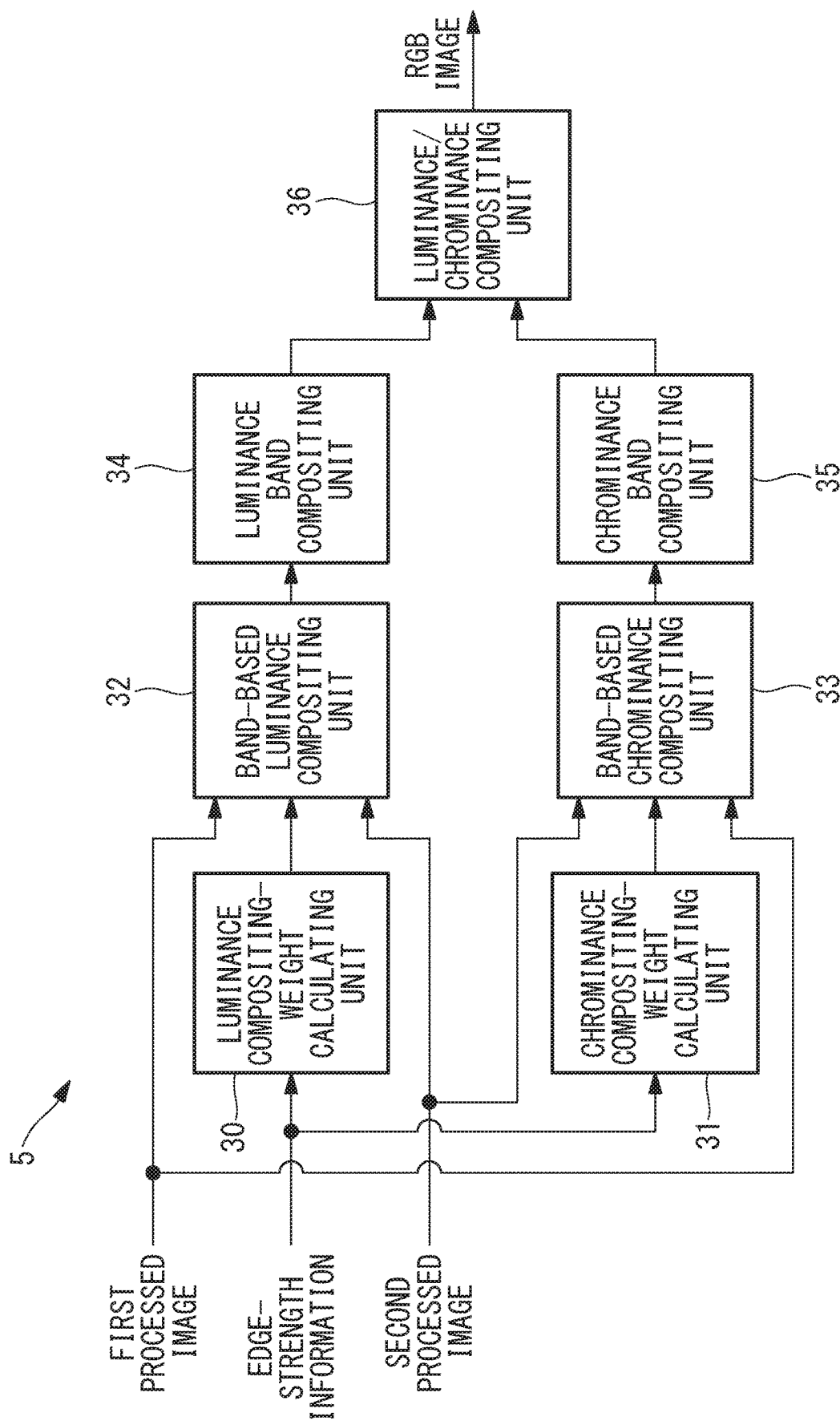
FIG. 8 is a block diagram showing an image compositing unit of the image processing device shown in FIG. 1.

Next, the image compositing unit 5 will be described. As shown in FIG. 8, the image compositing unit 5 is provided with a luminance compositing-weight calculating unit 30, a chrominance compositing-weight calculating unit 31, a band-based luminance compositing unit 32, a band-based chrominance compositing unit 33, a luminance band compositing unit 34, a chrominance band compositing unit 35, and a luminance/chrominance compositing unit 36. The luminance compositing-weight calculating unit 30 calculates weights expressing a compositing ratio for compositing the luminance information, on the basis of the edge-strength information output from the edge-strength calculating unit 2 The chrominance compositing-weight calculating unit 31 calculates weights expressing a compositing ratio for compositing the chrominance information, on the basis of the edge-strength information. The band-based luminance compositing unit 32 composites the luminance information in the first processed image and the luminance information in the second processed image on the basis of the calculated weights. The band-based chrominance compositing unit 33 composites the chrominance information in the first processed image and the chrominance information in the second processed image on the basis of the calculated weights. The luminance band compositing unit 34 applies band compositing to the composited band-based luminance composite images. The chrominance band compositing unit 35 applies band compositing to the composited band-based chrominance composite images. The luminance/chrominance compositing unit 36 generates an RGB image from a luminance composite image and a chrominance composite image that are obtained after the band compositing.

Figure 9:
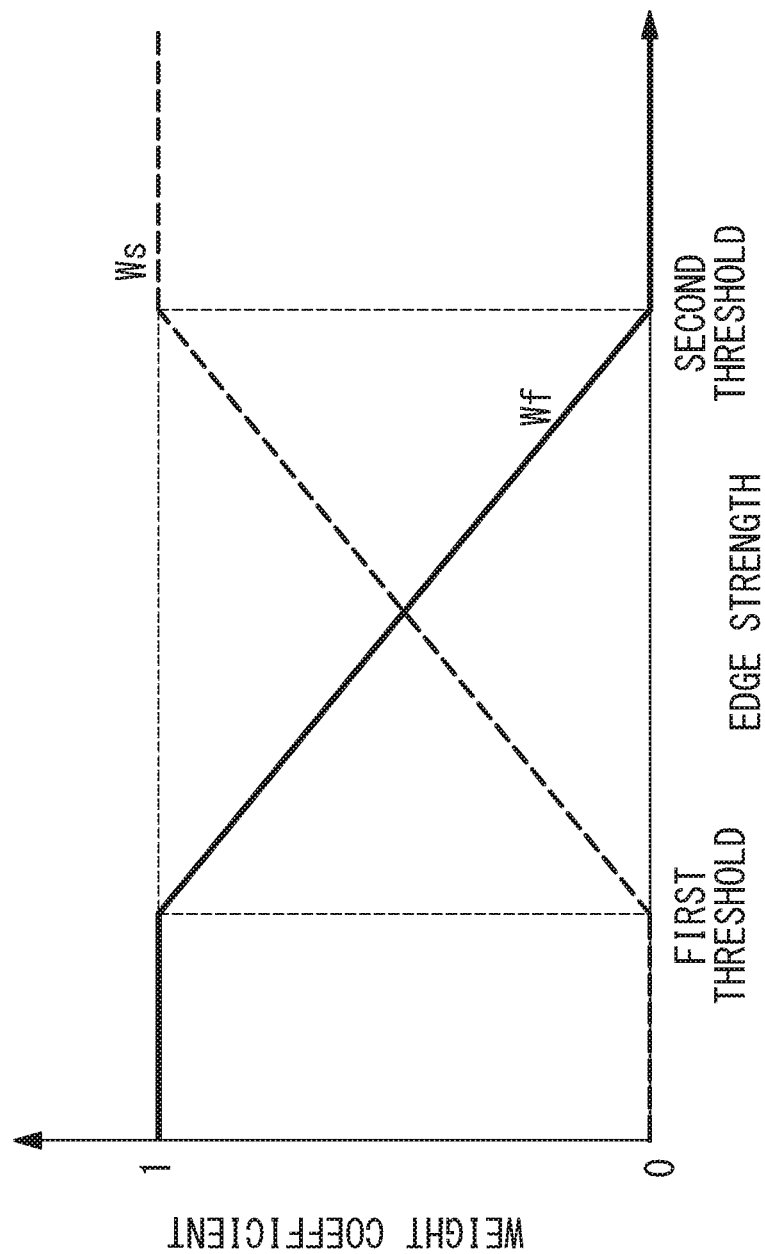
FIG. 9 is a view showing an example relationship between edge strength and weight coefficients calculated in weight calculating units provided in the image compositing unit shown in FIG. 8.

The luminance compositing-weight calculating unit 30 and the chrominance compositing-weight calculating unit 31 calculate weight coefficients, as shown in FIG. 9, by using the edge-strength information calculated in the edge-strength calculating unit 2.

FIG. 9 shows the relationship between the edge strength and the weight coefficients. In a case in which the edge strength is less than a first threshold, a weight coefficient Ws=0, which means that the compositing ratio of the first processed image, which has been subjected to noise-reduction processing using spatial information, is set to 0%, and a weight coefficient Wf=1, which means that the compositing ratio of the second processed image, which has been subjected to noise-reduction processing using frequency information, is set to 100%, and, in a case in which the edge strength is greater than a second threshold that is greater than the first threshold, the weight coefficient Ws=1, which means that the compositing ratio of the first processed image is set to 100%, and the weight coefficient Wf=0, which means that the compositing ratio of the second processed image is set to 0%.

Furthermore, within the range of the edge strength between the first threshold and the second threshold, the weight coefficient Ws of the first processed image is gradually increased, and the weight coefficient Wf of the second processed image is gradually reduced, such that the sum of the weight coefficients Ws and Wf is set to 1.

Specifically, compositing of the first processed image and the second processed image can be expressed by the following expressions.

$$NRI = Wf \times NRf + Ws \times NRs$$

$$Wf + Ws = 1$$

Here, NRs indicates the first processed image, NRf indicates the second processed image, and NRI indicates a composite image.

An image processing method using the thus-configured image processing device 1 of this embodiment will be described below.

Figure 10:
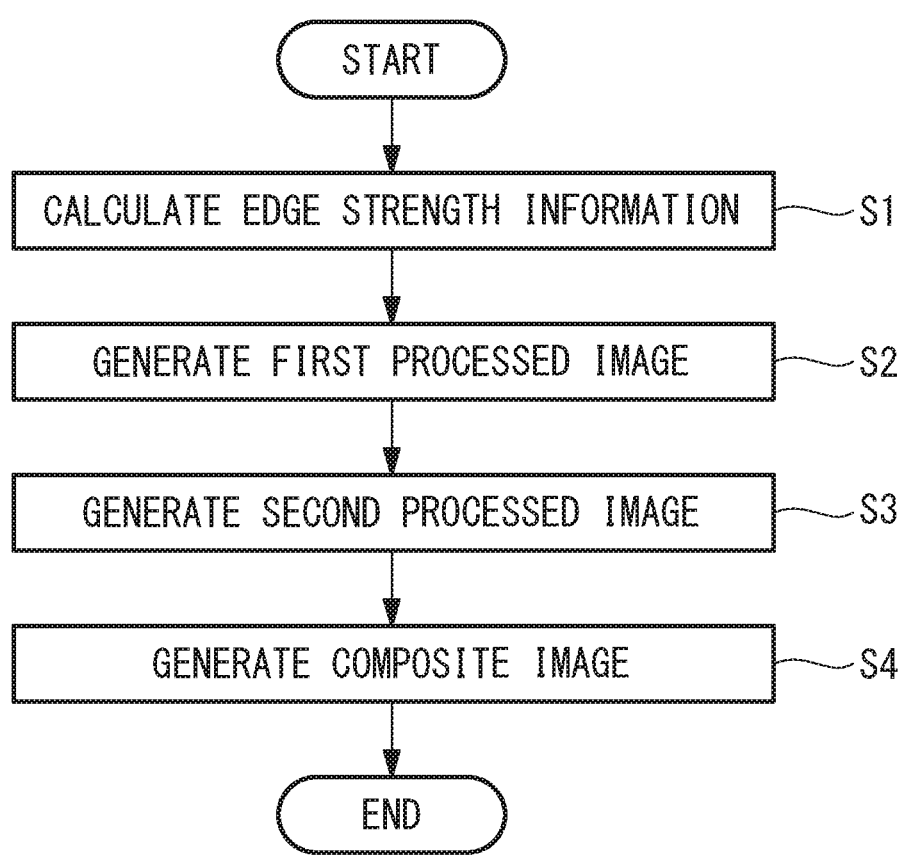
FIG. 10 is a flowchart for explaining an image processing method according to the one embodiment of the present invention.

In order to perform noise-reduction processing for reducing noise included in an image, by using the image processing device 1 of this embodiment, as shown in FIG. 10, edge-strength information is calculated from an RGB image that is acquired by the image acquisition unit 130 and that is subjected to preprocessing, thereby being developed, in the preprocessing unit 140 (edge-strength detection step S1). NLM processing is applied in the first noise-reduction unit 3, thereby generating a first processed image (first noise-reduction step S2). DCT-coring processing and Wiener filtering processing are applied in the second noise-reduction unit 4, thereby generating a second processed image (second noise-reduction step S3).

Then, weights expressing a compositing ratio are determined on the basis of the edge-strength information calculated in Step S1, and the first processed image and the second processed image are composited according to the determined weights (image compositing step S4).

In this case, on the basis of the edge strength (the contrast magnitude) included in an image, it is possible to adaptively use a noise-reduction image obtained by using spatial information and a noise-reduction image obtained by using frequency information and to use information having a large noise-reduction effect in the respective images. As a result, there is an advantage in that it is possible to acquire a high-quality image in which noise has been reduced and contrast has been maintained, without depending on the magnitude of true contrast of a subject.

Specifically, in a case in which the edge strength is less than the first threshold, almost no edge exists, and thus, frequency information is superior to spatial information, such as pattern matching, calculated from the feature of an image, in terms of the noise reduction performance. In this case, only the frequency information is used by setting the weight coefficient Wf, which is related to frequency information, to the maximum and setting the weight coefficient Ws, which is related to spatial information, to the minimum, thereby making it possible to effectively reduce noise.

On the other hand, in a case in which the edge strength is greater than the second threshold, a strong edge exists, and thus, spatial information, such as pattern matching, calculated from the feature of an image, is superior to frequency information, in terms of the noise reduction performance. In this case, only the spatial information is used by setting the weight coefficient Wf, which is related to frequency information, to the minimum and setting the weight coefficient Ws, which is related to spatial information, to the maximum, thereby making it possible to effectively reduce noise.

Furthermore, in a case in which the edge strength falls within the range between the first threshold and the second threshold, the weight coefficients Wf and Ws are set such that the compositing ratio of the first processed image, which is obtained by using spatial information, is increased as the edge strength is increased, thereby making it possible to adaptively use a noise-reduction image obtained by using spatial information and a noise-reduction image obtained by using frequency information.

Figure 11:
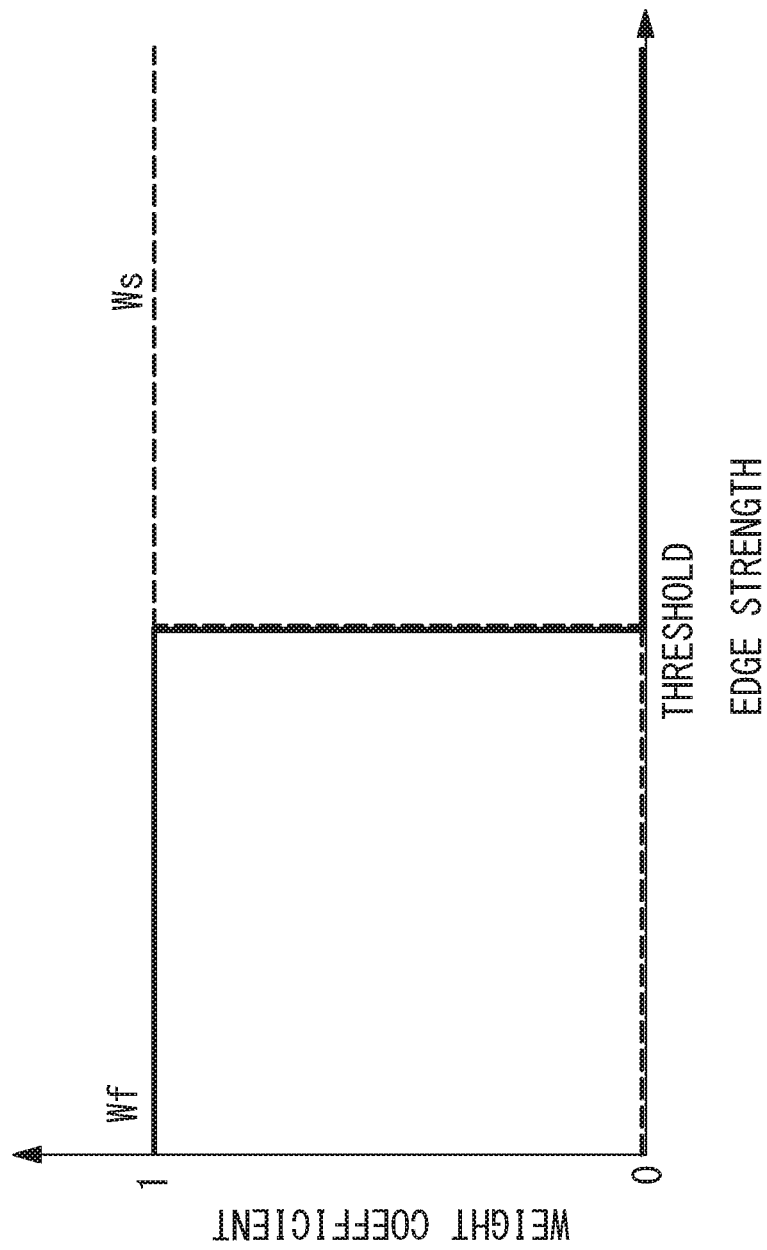
FIG. 11 is a view showing another example relationship between edge strength and weight coefficients calculated in the weight calculating units provided in the image compositing unit shown in FIG. 8.

Note that, in this embodiment, as shown in FIG. 9, although the weights with respect to the edge strength are defined so as to be changed at the two thresholds, as shown in FIG. 11, it is also possible to switch the weights at a single threshold.

Figure 12:
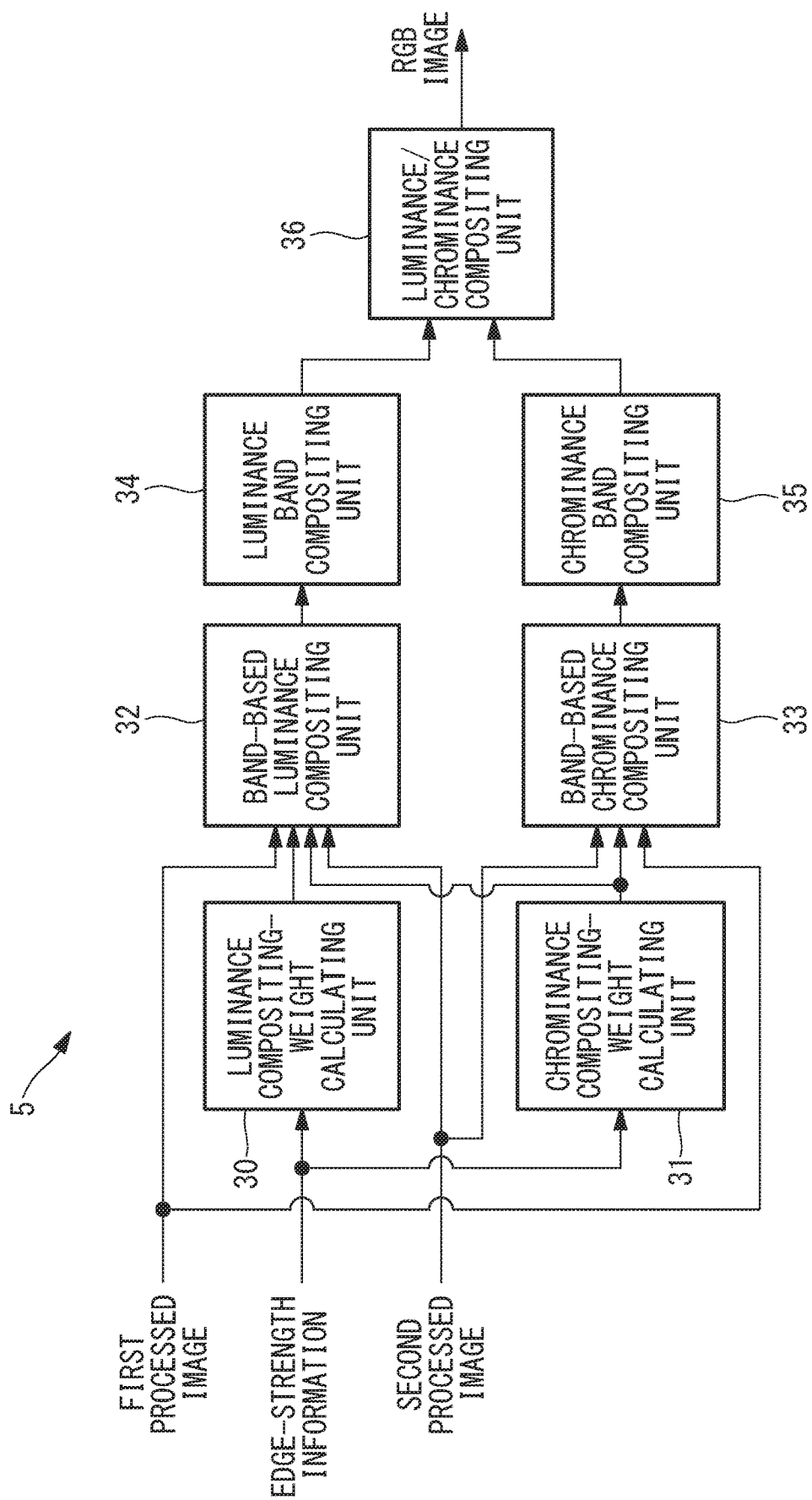
FIG. 12 is a block diagram showing a modification of the image compositing unit of the image processing device shown in FIG. 1.

Furthermore, as shown in FIG. 12, the band-based luminance compositing unit 32 of the image compositing unit 5 may perform compositing by using, in addition to the weight coefficients calculated by the luminance compositing-weight calculating unit 30, the weight coefficients calculated by the chrominance compositing-weight calculating unit 31.

There are cases in which a region that has a large colored edge/contrast exists in an image. There are also cases in which luminance information is relatively small whereas chrominance information is large (primary colors, such as red and blue, are strong). In such cases, because the edge strength is small when the luminance information is small, the image compositing unit 5 of FIG. 12 performs compositing in which the weight for the second processed image, which is obtained by using frequency information, is increased. However, because the weight for information related to a large-contrast structure is reduced, it is likely that the colored edge/contrast is reduced.

With the configuration shown in FIG. 12, for a section having larger colored edge/contrast, even if edge information is weak, the weight for the first processed image, which is obtained by using spatial information for maintaining the structure, can be increased. A luminance composite image obtained with the configuration shown in FIG. 12 is expressed as follows.

$$NRI=(Wf(y)-Wf(y)\times Ws(c))\times NRf+(Ws(y)+Wf(y)\times Ws(c))\times NRs$$

$$Wf(y)+Ws(y)=1$$

$$0 \leq Ws(c) \leq 1$$

Here, Wf(y) and Ws(y) are respectively weight coefficients for the first processed image and the second processed image in luminance information, and Ws(c) is a weight coefficient for the first processed image in chrominance information. According to this expression, the weight coefficient for the first processed image in the chrominance information is emphasized more than the first weight coefficient in the luminance information. Table 1 shows composite images obtained when the weight coefficients are set to the minimum and the maximum.

TABLE 1

| W_s (y) | W_f (y) | W_s (c) | NR_l |
|---|---|---|---|
| 0 | 1 | 0 | NR_f |
| 0 | 1 | 1 | NR_s |
| 1 | 0 | 0 | NR_s |
| 1 | 0 | 1 | NR_s |

According to this data, even when the weight coefficient for the first processed image in the luminance information is small, if the weight coefficient for the first processed image in the chrominance information is large, the weight coefficient for the first processed image in the luminance information becomes large. Therefore, in an image in which, although the luminance information is small, the chrominance information is large, and a colored edge/contrast is large, it is possible to correct the weights in compositing of luminance information, by using a weight in chrominance information having large contrast, and to achieve appropriate noise reduction.

Furthermore, in this embodiment, although a description has been given of a configuration in which the image processing method is realized by means of hardware, it is also possible to realize the image processing method by means of an image processing program that can be executed by a computer. In this case, the computer is provided with a CPU, a main storage device, such as a RAM, and a computer-readable recording medium, and the image processing program for realizing the above-described processing is recorded in the recording medium. Then, the CPU reads the image processing program, which is recorded in the recording medium, thus making it possible to realize the same processing as that of the image processing device 1.

Furthermore, in this embodiment, although a description has been given of a case in which the image processing device 1 is applied to the camera 100, instead of this, the image processing device 1 can be applied to an arbitrary image capturing device, such as a microscope and an endoscope.

The above-described embodiment also leads to the following invention.

According to one aspect, the present invention provides an image processing device including: an edge-strength detecting unit that detects edge-strength information expressing an edge strength in an acquired image; a first noise-reduction unit that applies noise-reduction processing using spatial information to the image; a second noise-reduction unit that applies noise-reduction processing using frequency information to the image; and an image compositing unit that composites a first processed image that has been subjected to the noise-reduction processing in the first noise-reduction unit and a second processed image that has been subjected to the noise-reduction processing in the second noise-reduction unit, wherein the image compositing unit performs the compositing by using weights in which a compositing ratio of the first processed image becomes higher than a compositing ratio of the second processed image, in a region where the edge strength, which is expressed by the edge-strength information detected by the edge-strength detecting unit, is greater than a predetermined threshold, and in which the compositing ratio of the second processed image becomes higher than the compositing ratio of the first processed image, in a region where the edge strength is less than the threshold.

According to this aspect, an image acquired by an image acquisition device is input to the edge-strength detecting unit, the first noise-reduction unit, and the second noise-reduction unit. In the edge-strength detecting unit, edge-strength information expressing the edge strength in the input image is detected. In the first noise-reduction unit, noise-reduction processing using spatial information is performed, thus generating a first processed image. In the second noise-reduction unit, noise-reduction processing using frequency information is performed, thus generating a second processed image.

Then, in the image compositing unit, the first processed image and the second processed image are composited by using weights based on the information expressing the edge strength and detected by the edge-strength detecting unit. As a result, in a region where the edge strength is greater than the predetermined threshold, the compositing is performed such that the compositing ratio of the first processed image is higher than the compositing ratio of the second processed image, and, in a region where the edge strength is less than the predetermined threshold, the compositing is performed such that the compositing ratio of the second processed image is higher than the compositing ratio of the first processed image.

Specifically, in a region where the edge strength is small, the compositing ratio of the second processed image, which has been subjected to noise-reduction processing using frequency information, is increased, and, in a region where the edge strength is large, the compositing ratio of the first processed image, which has been subjected to noise-reduction processing using spatial information, is increased, thereby making it possible to generate a high quality image in which noise has been reduced, and contrast has been maintained, irrespective of the magnitude of contrast of the image.

In the above-described aspect, the image compositing unit may perform the compositing by using weights in which the compositing ratio of the second processed image becomes higher than the compositing ratio of the first processed image, at a first threshold, in which the compositing ratio of the first processed image becomes higher than the compositing ratio of the second processed image, at a second threshold that is greater than the first threshold, and in which, as the edge strength, which is expressed by the edge-strength information, is increased, the compositing ratio of the first processed image is gradually increased, and the compositing ratio of the second processed image is gradually reduced, within the range between the first threshold and the second threshold.

By doing so, the effect of noise-reduction processing on contrast can be smoothly changed according to the magnitude of the edge strength.

Furthermore, in the above-described aspect, the image compositing unit may perform the compositing by using weights in which the compositing ratio of the first processed image and the compositing ratio of the second processed image are switched at the threshold.

By doing so, with the simple configuration, noise is reduced without reducing contrast, thereby making it possible to generate a high quality image.

Furthermore, in the above-described aspect, the information expressing the edge strength may be luminance dispersion in a pixel block that is composed of a plurality of pixels.

Furthermore, in the above-described aspect, the edge-strength detecting unit may detect the amount of change in luminance by using an edge detection filter.

Furthermore, in the above-described aspect, the information expressing the edge strength may be a degree of texture in a pixel block that is composed of a plurality of pixels.

Furthermore, in the above-described aspect, the information expressing the edge strength may be a distribution of frequency components in a pixel block that is composed of a plurality of pixels.

Furthermore, in the above-described aspect, the information expressing the edge strength may be a contrast value in a pixel block that is composed of a plurality of pixels.

Furthermore, in the above-described aspect, the information expressing the edge strength may be a blur amount in a pixel block that is composed of a plurality of pixels.

Furthermore, in the above-described aspect, the information expressing the edge strength may be pattern flatness in a pixel block that is composed of a plurality of pixels.

Furthermore, according to another aspect, the present invention provides an image processing method including: an edge-strength detection step of detecting edge-strength information expressing an edge strength in an acquired image; a first noise-reduction step of applying noise-reduction processing using spatial information to the image; a second noise-reduction step of applying noise-reduction processing using frequency information to the image; and an image compositing step of compositing a first processed image that has been subjected to the noise-reduction processing in the first noise-reduction step and a second processed image that has been subjected to the noise-reduction processing in the second noise-reduction step, wherein, in the image compositing step, the compositing is performed by using weights in which a compositing ratio of the first processed image becomes higher than a compositing ratio of the second processed image, in a region where the edge strength, which is expressed by the edge-strength information detected in the edge-strength detection step, is greater than a predetermined threshold, and in which the compositing ratio of the second processed image becomes higher than the compositing ratio of the first processed image, in a region where the edge strength is less than the threshold.

Furthermore, according to still another aspect, the present invention provides an image processing program for causing a computer to execute: an edge-strength detection step of detecting edge-strength information expressing an edge strength in an acquired image; a first noise-reduction step of applying noise-reduction processing using spatial information to the image; a second noise-reduction step of applying noise-reduction processing using frequency information to the image; and an image compositing step of compositing a first processed image that has been subjected to the noise-reduction processing in the first noise-reduction step and a second processed image that has been subjected to the noise-reduction processing in the second noise-reduction step, by using weights in which a compositing ratio of the first processed image becomes higher than a compositing ratio of the second processed image, in a region where the edge strength, which is expressed by the edge-strength information detected in the edge-strength detection step, is greater than a predetermined threshold, and in which the compositing ratio of the second processed image becomes higher than the compositing ratio of the first processed image, in a region where the edge strength is less than the threshold.

REFERENCE SIGNS LIST 1 image processing device
2 edge-strength calculating unit (edge-strength detecting unit)
3 first noise-reduction unit
4 second noise-reduction unit
5 image compositing unit
S1 edge-strength detection step
S2 first noise-reduction step
S3 second noise-reduction step
S4 image compositing step

The invention claimed is:

1. An image processing device comprising:
a computer that is configured to:
detect edge-strength information expressing an edge strength in an acquired image;
apply noise-reduction processing using spatial information to the image;
apply noise-reduction processing using frequency information to the image; and
composite a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

2. The image processing device according to claim 1, wherein the computer is configured to composite the first processed image and the second processed image, by using weights in which the compositing ratio of the second processed image becomes higher than the compositing ratio of the first processed image, at a first threshold, in which the compositing ratio of the first processed image becomes higher than the compositing ratio of the second processed image, at a second threshold that is greater than the first threshold, and in which, as the edge strength, which is expressed by the edge-strength information, is increased, the compositing ratio of the first processed image is gradually increased, and the compositing ratio of the second processed image is gradually reduced, within the range between the first threshold and the second threshold.

3. The image processing device according to claim 1, wherein the computer is configured to composite the first processed image and the second processed image, by using weights in which the compositing ratio of the first processed image and the compositing ratio of the second processed image are switched at the threshold.

4. The image processing device according to claim 1, wherein the information expressing the edge strength is luminance dispersion in a pixel block that is composed of a plurality of pixels.

5. The image processing device according to claim 1, wherein the computer is configured to detect the amount of change in luminance by using an edge detection filter.

6. The image processing device according to claim 1, wherein the information expressing the edge strength is a degree of texture in a pixel block that is composed of a plurality of pixels.

7. The image processing device according to claim 1, wherein the information expressing the edge strength is a distribution of frequency components in a pixel block that is composed of a plurality of pixels.

8. The image processing device according to claim 1, wherein the information expressing the edge strength is a contrast value in a pixel block that is composed of a plurality of pixels.

9. The image processing device according to claim 1, wherein the information expressing the edge strength is a blur amount in a pixel block that is composed of a plurality of pixels.

10. The image processing device according to claim 1, wherein the information expressing the edge strength is pattern flatness in a pixel block that is composed of a plurality of pixels.

11. An image processing method comprising:
detecting edge-strength information expressing an edge strength in an acquired image;
applying noise-reduction processing using spatial information to the image;
applying noise-reduction processing using frequency information to the image; and
compositing a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

12. A non-transitory computer-readable medium having an image processing program stored thereon, the image processing program causing a computer to execute functions of:
detecting edge-strength information expressing an edge strength in an acquired image;
applying noise-reduction processing using spatial information to the image;
applying noise-reduction processing using frequency information to the image; and
compositing a first processed image that has been subjected to the noise-reduction processing using spatial information and a second processed image that has been subjected to the noise-reduction processing using frequency information, by using weights in which a compositing ratio of the first processed image becomes higher than a compositing ratio of the second processed image, in a region where the edge strength, which is expressed by the detected edge-strength information, is greater than a predetermined threshold, and in which the compositing ratio of the second processed image becomes higher than the compositing ratio of the first processed image, in a region where the edge strength is less than the threshold.

\* \* \* \* \*